Nov. 29, 1955 A. S. KROTZ 2,724,864
APPARATUS AND METHOD FOR MAKING COMPOSITE ARTICLES
Filed April 29, 1949 2 Sheets-Sheet 1

Inventor
Alvin S. Krotz
By
Atty

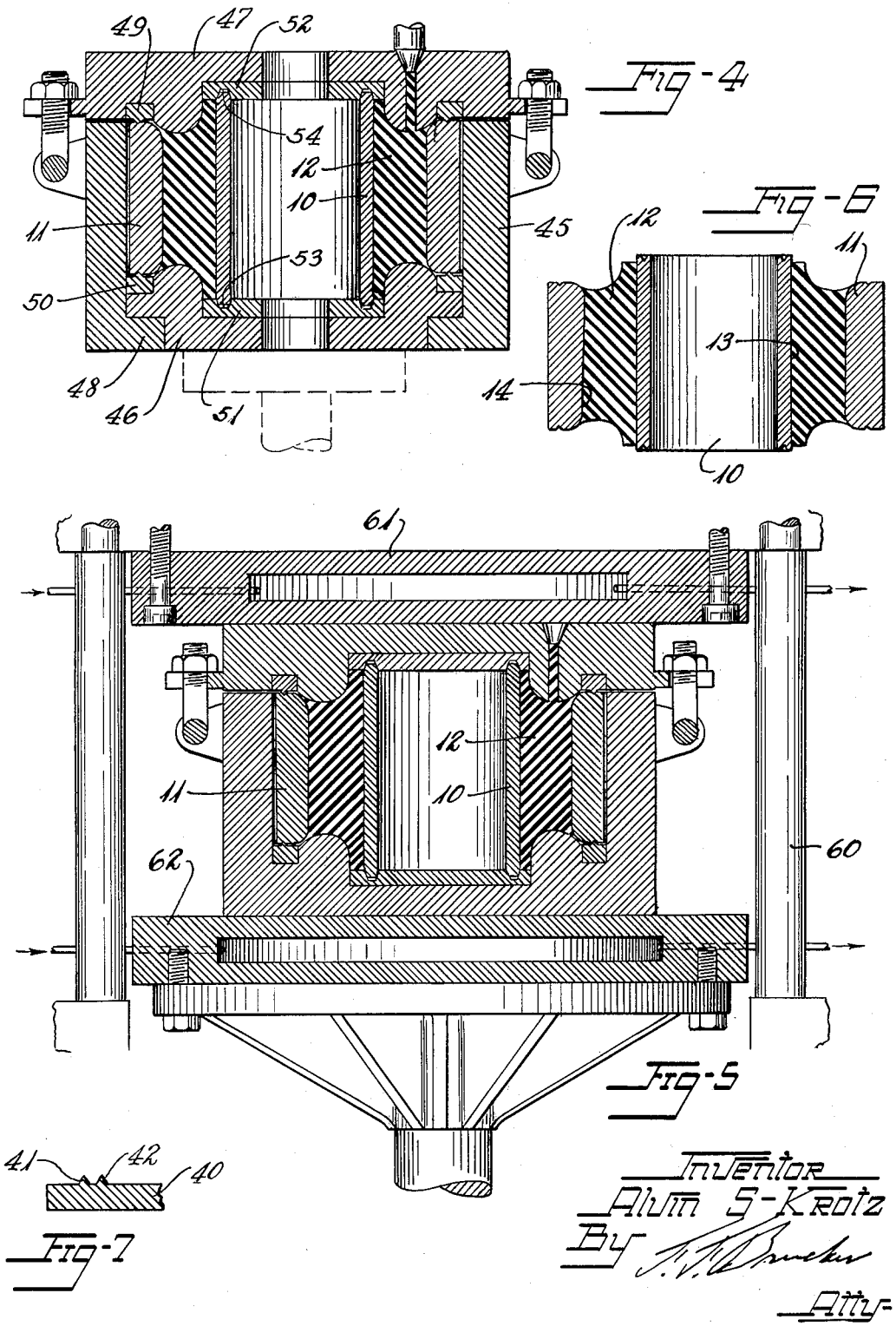

United States Patent Office 2,724,864
Patented Nov. 29, 1955

2,724,864

APPARATUS AND METHOD FOR MAKING COMPOSITE ARTICLES

Alvin S. Krotz, Akron, Ohio, assignor to The B. F. Goodrich Company, New York, N. Y., a corporation of New York Application April 29, 1949, Serial No. 90,469

8 Claims. (Cl. 18—42)

This invention relates to the making of composite articles of stiff material and resilient moldable material and is especially useful where it is desired to mold and bond rubber compositions or similar resilient materials to bodies of metal.

The invention is especially useful in the manufacture of torsion springs of rubber composition where the rubber composition is to be confined between concentrically arranged metal sleeves, although the invention may also be useful in the manufacture of other articles having both stiff and resilient parts.

In the manufacture of composite articles such as torsion springs, motor mountings and the like, difficulty has been experienced due to the fact that the metal parts required accurate manufacture and close inspection. If the metal parts were too large either they could not be entered in the molds used for molding the resilient rubber-like material thereto or the molds would not close resulting in escape of the rubber-like material and loss of proper molding pressure. If the metals were too small, the plastic rubber-like material would flow thereabout to positions where it was not desired.

Good results in molding torsion springs of short length, having inner and outer tubular metal members and an annulus of resilient rubber-like material therebetween and bonded thereto, have been accomplished by enclosing the metal parts between mold members engaging their ends and injecting the plastic rubber-like material into the space between the metal parts from the ends thereof through a sprue opening in one of the mold members. Such a procedure, however, has required machining of the metal parts to close limits as otherwise the metal parts would not seal against the mold members and material would escape beyond the metal parts.

It is an object of this invention to provide for use of less closely machined or cast metal members without escape of the plastic material.

Other objects are to provide for sealing off the metal parts at the faces of the mold, to provide for utilizing the metal parts themselves in sealing off the mold, and for coining or sizing the metal parts during the molding operation.

These and other objects will appear from the following description and the accompanying drawings.

Of the drawings,

Fig. 4 is a view similar to Fig. 1, showing a modification of the mold.

Fig. 5 is a cross-sectional view of the mold and article of Fig. 4 in a curing press.

Fig. 6 is a cross sectional view of the finished article.

Fig. 7 is a sectional view of a modification of mold plate for use in the mold of Fig. 1.

Figure 1:
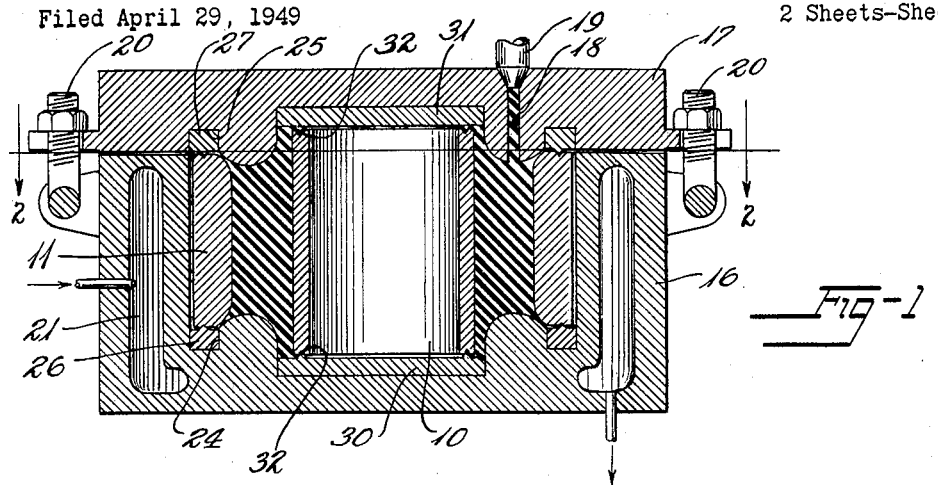
Fig. 1 is a vertical cross-sectional view of a mold constructed in accordance with and embodying the invention, the mold being shown in closed position with the metal spring parts and rubber-like material of a spring in molding position.
Figure 2:
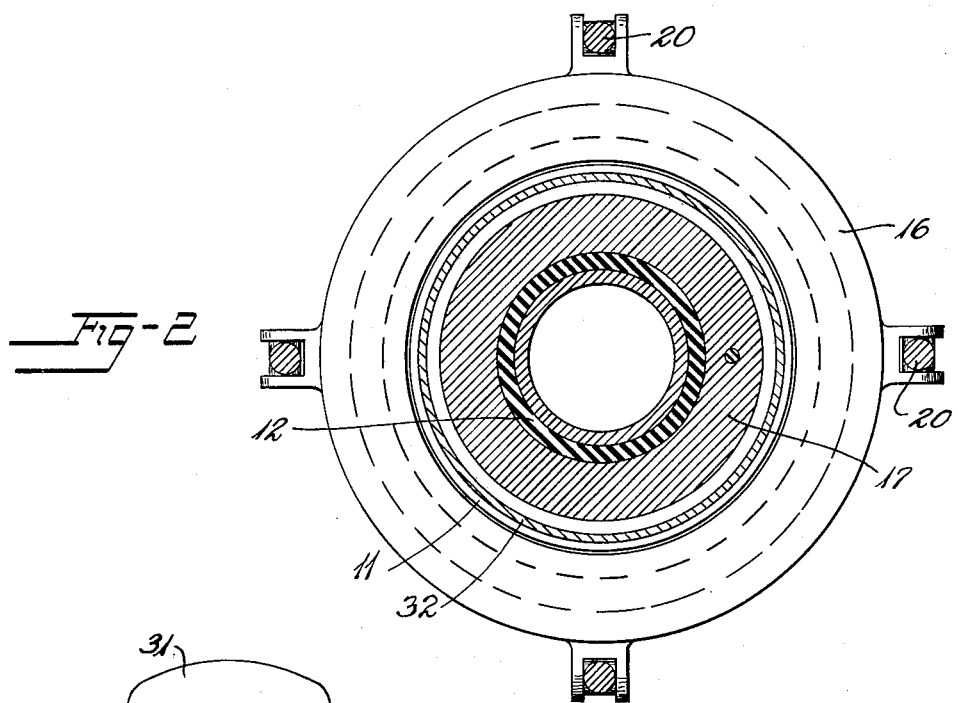
Fig. 2 is a cross-section thereof, taken on line 2—2 of Fig. 1.
Figure 3:
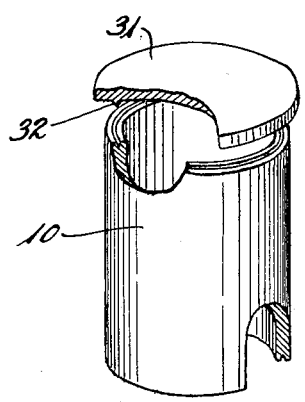
Fig. 3 is a perspective view of the inner tubular metal member of the spring and one of the coining plates of the mold, part of the plate being broken away.

Referring to the drawings, the article, shown as an example in Fig. 6, is typical of an article to which the invention may be applied and comprises an inner bushing 10 of metal, an outer bushing 11 of metal and an annulus 12 of resilient rubber composition or other rubber-like material therebetween. The resilient material is bonded to the metal bushings at 13 and 14 by a bond resulting from vulcanization.

For forming the article, referring to Fig. 1, the metal parts 10 and 11 are inserted in a mold having a bottom cavity plate 16, and a top plate 17. Plastic material is injected through a sprue opening 18 in plate 17 by means of a nozzle 19 while the mold is held closed by clamp bolts 20. The mold may be heated by means of a steam cavity 21.

Ordinarily, such a mold would require the metal parts to be of exactly the correct lengths so as to seal off escape of plastic material. In order to permit use of metal parts having considerable variation in lengths, the mold plates 16, 17 are formed with annular recesses 24, 25 at the ends of the metal part 11 and coining members in the form of rings 26, 27 of hardened steel or similarly hard material are seated in the recesses. The rings 26, 27 have raised sealing edges of V-shape in cross-section, which face the metal part 11 and bite into its ends under pressure applied to the mold plates. In similar fashion removable hardened steel coining members in the form of discs 30, 31, each having a raised edge 32 of V-shaped cross-section extending thereabout and facing the ends of metal part 10 are adapted to bite into the part 10 and seal off the flow of plastic material. As the sealing edges project from the rings 26, 27 and discs 30, 31 a considerable distance, sealing is accomplished although the metal parts may differ in length considerably, so much so in fact that cast metal parts may be used without machining.

While the rings 30, 31 have been shown as having one sealing edge 32, more than one such edge, providing a multiple seal may be employed as in Fig. 7 where two concentric sealing edges 41, 42 and shown on a disc 40. The bases of the rings 24, 25 and the discs 30, 31 are made sufficiently broad as to distribute the pressure over an area such as not to crush the mold plates.

In the form of the invention shown in Figs. 4 and 5, the mold comprises a ring member 45 having a replaceable bottom plate 46 and a cover plate 47. The bottom plate overlaps an internal flange 48 of the ring member 45. For sealing the metal part 11, hardened rings 49, 50, like the rings 26, 27 are provided. For sealing the inner metal member 10, discs 51, 52 are seated in the mold plates. These discs have annular grooves 53, 54 having sloping side walls, the grooves being wider than the thickness of the metal bushing 10 at the faces of the rings and of less width than the thickness of the bushing 10 at their bottoms. The grooves are of such depth as to provide clearance at the ends of the bushing.

When the mold of Fig. 4 is closed under pressure, the ends of the bushing 10 are sealed by forcing the ends into the narrowing grooves and thereby coining or chamfering the bushing slightly while the cutting edges of the rings 49, 50 bite into and seal off the flow of plastic at the ring 11.

After filling the mold of Fig. 4 the mold may be placed in a curing press 60 where vulcanizing heat is applied by the steam heated platens 61, 62. The three part mold facilitates removal of the finished article as the bottom plate is exposed at the under side of the mold and may be forced out of the ring member with the article.

In practicing the invention, the metal parts 10, 11 are assembled within the mold of Fig. 1 or that of Fig. 4. The filled mold is then placed in a powerful press and sufficient pressure is applied to cause the metal parts to flow sufficient to seal the mold. The mold is then bolted, or otherwise clamped, preferably while under pressure. Then the mold is filled by injection and the rubber-like material is vulcanized in the mold. The mold is then disassembled and the article removed.

As the rubber-like material is sealed in place, no trimming of the article is required and there is no waste of rubber material.

While the invention has been described as applied to a torsion spring having cylindrical metal parts, it is also applicable to springs having polygonal bushings or to other articles. Where the metals are not annular the sealing inserts are provided of a shape to follow the cross-section of the metal parts to provide a seal thereabout or therealong depending upon their shape. The invention makes possible the use of sand or die cast metal parts without machining.

Variations may be made without departing from the scope of the invention as it is defined by the following claims.

I claim:

1. The method of making composite articles of metal parts and resilient moldable material which comprises mounting the metal parts between mold members having metal-forming sealing elements non-complemental to the metal parts, applying pressure to the mold members in a direction to form portions of the metal parts complemental to said elements by distortion of the metal of said parts under such pressure and thereby to engage said elements with said parts to seal off a cavity between the metal parts, then while holding the mold members and the metal parts in such clamped and sealed relation filling the cavity between the metal parts with plastic resilient material under pressure, and removing the article from said mold member.

2. The method of making composite articles of metal parts and resilient moldable material which comprises mounting the metal parts between mold members having raised sealing elements non-complemental to the metal parts, applying pressure to the mold plates in a direction to force the sealing elements into sealing relation with the metal parts to distort the metal parts under such pressure and thereby to seal off a cavity between the metal parts, and while holding the mold members and the metal parts in clamped and sealed relation filling the sealed cavity between the metal parts with plastic resilient material under pressure and removing the article from said mold members.

3. The method of making composite articles of metal parts and resilient moldable material which comprises mounting the metal parts between mold members defining a forming cavity therebetween having confining sockets non-complemental to the metal parts and of decreasing dimensions for receiving and forming portions of the metal parts, applying pressure to the mold members in a direction to force the metal parts into the sockets by distortion of the metal of said parts and to form the metal therein to provide a seal about the cavity between the metal parts, and while holding the mold members in clamped and sealed relation filling the sealed cavity between the metal parts with plastic resilient material under pressure, and removing the article from said mold members.

4. Apparatus for making composite articles of concentric metal bushings and resilient moldable material therebetween, said apparatus comprising mating mold members defining a forming cavity therebetween, hardened metal inserts non-complemental to said metal bushings in the cavity, said mold members being arranged in concentric relation to said metal bushings, each insert having a sharp upstanding annular knife edge positioned to contact the end of a bushing and to be forced into the metal at an end of the bushing to seal off a cavity between the concentric bushings by distortion of the metal of said bushings under pressure and thereby to engage said knife edges in sealing relation to said bushings, and means to clamp the mold parts with their inserts in sealed relation with the ends of the bushing while the cavity is filled with plastic resilient material under pressure.

5. The method of making composite articles of metal parts and resilient rubber material which comprises deforming ends of the metal parts by applying localized deforming pressure to each end to provide sealing surfaces while simultaneously closing the ends of the metal parts to provide a sealed molding cavity therebetween, injecting unvulcanized rubber material into the cavity while continuing pressure on the sealing surfaces, and vulcanizing the rubber material in the cavity while maintaining such pressure.

6. The method of making composite articles of metal parts and resilient rubber material which comprises deforming ends of the metal parts by applying localized deforming pressure to each end along a continuous area smaller than the area of the end of the part to provide sealing surfaces while simultaneously closing the ends of the parts to provide a sealed molding cavity therebetween, injecting unvulcanized rubber material into the cavity while continuing pressure on the sealing surfaces, and vulcanizing the rubber material in the cavity while maintaining such pressure.

7. The method of making composite articles of metal parts and resilient rubber material which comprises deforming ends of the metal parts by applying localized deforming pressure to each end along a continuous area smaller than the end adjacent the periphery of the end at its inner and outer faces to provide a sealed molding cavity between the metal parts, injecting unvulcanized rubber material into the cavity while continuing pressure on the sealing surfaces, and vulcanizing the rubber material in the cavity while maintaining such pressure.

8. A metal mold comprising at least two parts having cooperating faces between which a malleable metal part is adapted to be clamped, one of said parts having a mold cavity therein for receiving plastic material to be molded onto the malleable metal part, said face of said cavity containing mold part having a recess formed therein, an insert harder than said mold face located in said recess and projecting beyond said last mentioned face, said projecting portion of said insert being adapted to be pressed in the malleable metal and form a barrier against the flow of the plastic material from said mold cavity along the surface of the malleable metal beyond said barrier.

References Cited in the file of this patent

UNITED STATES PATENTS

| | | |
|---|---|---|
| 1,745,482 | Goodwin | Feb. 4, 1930 |
| 2,040,674 | Severance | May 12, 1936 |
| 2,187,165 | Lord | Jan. 16, 1940 |
| 2,351,329 | Gerstenmaier | June 13, 1944 |
| 2,407,559 | Krotz | Sept. 10, 1946 |